Patented Jan. 13, 1942

2,270,016

UNITED STATES PATENT OFFICE 2,270,016

THE USE OF GAS HYDRATES IN IMPROVING THE LOAD FACTOR OF GAS SUPPLY SYSTEMS

Matthew E. Benesh, Cicero, Ill., assignor to Chicago By-Products Corporation, Chicago, Ill., a corporation of Illinois No Drawing. Application May 25, 1938, Serial No. 209,979

10 Claims. (Cl. 48—190)

The present invention relates to a method of improving the load factor of fuel gas supply systems.

The demand on a fuel gas supply system normally fluctuates not only from hour to hour and day to day, but fluctuates most seriously due to variable seasonal requirements. The hourly and in part the daily fluctuations in the demand are conveniently and economically met by the low or high pressure storage of the fuel gas in gaseous phase in steel containers at ordinary atmospheric temperatures. The seasonal variations, however, involve the storage of such large volumes of gas in gaseous phase in the steel containers that the storage is not ecenomical. Since adequate plant production and pipe line transmission capacity are required for peak loads, the load factor realized on the entire system is materially lowered during periods of low seasonal demands, and consequently the investment required for a given annual output is considerably increased. It is also customary to provide reserve production and transmission capacity to insure continuity of supply in the event of plant or pipe line failure, and such reserve capacity still further reduces the load factor.

An object of the present invention is to provide a novel method of storing surplus gas for future needs which permits operating fuel gas supply systems at more economical load factors.

I make use of the fact that certain fuel gases combine with water to form crystalline compounds or solid gas hydrates at elevated pressures and at temperatures above the normal freezing point of water, i. e., above 32 degrees F. The formation of the hydrate when an excess supply of gas is available, and the regasification thereof in times of need can be carried out economically and rapidly by the use respectively of relatively high temperature refrigeration and relatively low temperature heat which are available in abundance and at low cost. The hydrate can be stored at small expense, and hence materially reduces the unit cost of the fuel from the supply system.

The preferred method is as follows: Manufactured fuel gas consisting chiefly of hydrocarbons or natural gas or a mixture of the two, adapted to form a solid hydrate, is taken from a system at times when a surplus quantity is available, for example, in the summer of the year when the system load is small.

The gas so taken is converted into a solid hydrate. This is accomplished by subjecting the gas to proper temperature and pressure conditions in the presence of water. The conditions are subject to selective variation, as is the fraction of gas most economically converted. Thus, an increase in temperature will require an increased pressure, and vice versa. The temperature and pressure conditions selected are those which are most economically justified. The hydrate can be formed at pressures that are not difficult or costly to obtain at atmospheric temperature or slightly lower temperatures. Since the higher temperatures require comparatively little and readily attainable and industrially available refrigeration at low cost, they are to be preferred. I have found that a natural gas hydrate will form very rapidly with the gas approximately at a temperature of 50 degrees F. and a pressure of 500 pounds per square inch. If the pressure were increased to slightly over 800 pounds per square inch, the natural gas hydrate would form at approximately 60 degrees F. It will be evident that these temperatures are readily obtainable, for example, by the use of cold water in direct contact with the gas, as the source of the water for the reaction.

The reaction may be conveniently accomplished by any desired means providing a large reaction surface of water to gas and adequate removal of the heat of hydrate formation. Experience shows the desirability of crystal seeding and agitation, which should be quite violent to avoid the formation of large clear flake-like crystals containing uncombined water. If crystals with included water were obtained, a considerably longer time of reaction would be required to secure a high percentage of conversion of the water. Breaking up the flake-like crystals mechanically helps to speed up the conversion.

Since the reaction is carried on above the freezing point of water, a most convenient source of needed refrigeration, for economically and rapidly removing the large quantity of heat of hydrate formation, is afforded by water ice. This ice may be produced in abundance and at a low cost by spraying water in fine droplets from the top of an elevated tower outdoors during freezing weather. These droplets of water present an extended surface exposed to the outside cool air, and quickly freeze into fine particles of ice. The size of the water droplets may be regulated in accordance with atmospheric conditions so as to obtain any desired degree of solidification. Upon freezing, the solid ice particles fall to the ground in the form of a fine hail. A sufficient quantity of the water ice, thus formed by natural cold during the winter, is produced to last during the non-freezing seasons. The ice may be stored for future use in any convenient or desired manner, for example, in the open, or in a pit which may be open, covered or enclosed.

When hydrate is to be formed, a suitable quantity of the ice is brought into heat exchange relationship with the gas in any suitable manner, for example, as a medium for cooling by direct contact the water to be used in the hydrate forming reaction.

While I have specifically disclosed the use of ice-cooled water, it is to be understood that ordinarily available relatively cold water, not precooled to closely above the freezing point, may be used, and in this event a higher pressure would be used to compensate for the relatively higher temperature. After the reaction, any uncombined gas may be returned to the system, or utilized for an immediate purpose.

I have found that the rate of hydrate formation in chambers or towers may be accelerated by the use of a suitable addition agent in low concentrations. The addition to the water of a small amount of ethyl or methyl alcohol, for example, approximately 2.0 per cent. ethyl alcohol, will effect such acceleration by increasing the solubility of the gas in the water. Very low concentrations of soap solutions, for example, approximately 0.1 per cent., also give satisfactory results in that they lower the surface tension of the water, and are inexpensive. Acetic acid, for example, approximately 1.0 per cent., also may be used.

The resulting gas hydrate consists of solid crystals which may be stored at any desired pressure and corresponding temperature. Storage at atmospheric pressure, although not necessary, is ordinarily desirable for economic reasons, and therefore the hydrate crystals are cooled so that they will exert not more than atmospheric vapor pressure. Thus, for natural gas, the hydrate may be maintained in equilibrium at atmospheric pressure when cooled to approximately minus 26 degrees F. Even at or slightly above a temperature of 20 degrees F., which is well below the freezing point of water, the hydrate will give off a vapor pressure of only 44 pounds per square inch. Preferably, the hydrate crystals are compressed either before or after cooling into solid blocks of convenient size and shape for storage in suitably insulated and refrigerated buildings. They occupy a small space and require only a low refrigeration at atmospheric pressure to prevent regasification. The hydrate provides a very convenient form for the transportation of gas.

When gas in excess of the plant or pipe line capacity is needed, the hydrate is taken from storage and reconverted into gas by the application of heat, to supplement the normal supply. The released gas is returned to the pipe lines or storage facilities of the gas supply system. The reconversion may be conveniently and inexpensively accomplished by relatively low temperature heat. For example, the latent heat of fusion of ice or sensible heat of water may be used.

It will be evident that I have provided an efficient and economically justified method of improving the load factor of gas fuel supply systems, and specifically including a new and improved method of storing fuel gas during periods of excess supply in the form of a compact solid hydrate. The method makes possible the maintenance of an adequate supply of gas at all times without taxing the capacity of the gas production facilities during periods of peak loads, and without requiring expensive transmission and storage facilities. The value of the gas is not compared by conversion into a solid gas hydrate, and the subsequent reconversion into the original state. It will be understood that either single or compound hydrates may be obtained depending on the constituent gases.

I claim as my invention:

1. The method of improving the load factor of a fuel gas supply system which comprises taking gas consisting chiefly of hydrocarbons in excess of current demand from the system during periods of low load, bringing the gas into direct intimate contact with a quantity of water sufficient in amount and under temperature and pressure conditions to form a solid hydrocarbon hydrate, storing the solid hydrate separately of said system, applying heat to the solid hydrate to regasify said hydrate when the supply of gas in the system is inadequate to satisfy the current demand during periods of high load, and returning the regenerated gas to the system for distribution to supplement the current supply of gas.

2. The method of improving the load factor of a fuel gas supply system which comprises taking gas consisting chiefly of hydrocarbons in excess of demand from the system during periods of low load, treating the gas with ice-cooled water at a temperature above the freezing temperature of water and a pressure effective to form solid hydrocarbon hydrates, storing the solid hydrates separately of said system at atmospheric pressure and a temperature effective to prevent regasification, bringing the solid hydrates into heat exchange relation with water at atmospheric pressure and a temperature effective to regasify said hydrates when the supply of gas in the system is inadequate to satisfy the demand during periods of high load, and returning the regenerated gas to the system for distribution.

3. The method of storing gas consisting chiefly of hydrocarbons which comprises bringing the gas into finely dispersed intimate contact with a quantity of water adapted to convert a substantial portion of the gas into a solid hydrocarbon hydrate, maintaining the gas while in such contact under temperature and pressure conditions effective to cause the formation of the hydrate, and storing the hydrate separately under temperature and pressure conditions inhibiting regasification.

4. The method of storing gas consisting chiefly of hydrocarbons which comprises bringing the gas into intimate contact with a quantity of water adapted to convert a substantial portion of the gas into a solid hydrocarbon hydrate, maintaining the gas while in such contact under a temperature above the freezing temperature of the water and a related pressure effective to cause the formation of the hydrate, compressing the hydrate under pressure into solid blocks, and storing the blocks under temperature and pressure conditions inhibiting regasification.

5. The method of storing gas consisting chiefly of hydrocarbons which comprises bringing the gas into intimate contact with water present in an amount sufficient to satisfy the solid hydrocarbon hydrate forming reaction, supplying with the water a low concentration of approximately 2.0 per cent. of alcohol adapted to accelerate the reaction, maintaining the gas while in such contact under temperature and pressure conditions effective to cause the formation of the hydrate, and storing the hydrate separately under temperature and pressure conditions inhibiting regasification.

6. The method of storing gas consisting chiefly of hydrocarbons which comprises bringing the gas into intimate contact with water and present in an amount sufficient to satisfy the solid hydrocarbon hydrate forming reaction, supplying with the water a low concentration of soap in solution adapted to accelerate the reaction, maintaining the gas while in such contact under temperature and pressure conditions effective to cause the formation of the hydrate, and storing the hydrate separately under temperature and pressure conditions inhibiting regasification.

7. The method of storing gas consisting chiefly of hydrocarbons which comprises providing water containing in solution a low concentration of one of a group of addition agents consisting of approximately 2.0 per cent. methyl alcohol, approximately 2.0 per cent. ethyl alcohol and approximately 0.1 per cent. soap, bringing the gas into intimate contact with the water and addition agent, maintaining the gas while in such contact under a temperature above the freezing temperature of the water and under a pressure effective to cause the formation of a solid hydrocarbon hydrate, compressing the hydrate into form sustaining blocks, storing the blocks under atmospheric pressure and under a temperature inhibiting regasification, and regasifying the blocks of solid hydrate by adding heat.

8. The method of handling gas consisting chiefly of hydrocarbons which comprises taking such gas from a transmission line of a gas producing, transmitting and distributing system, solidifying the gas taken from said line into a solid hydrocarbon hydrate, storing the solidified gas separately of said system, and regasifying the solidified gas and returning it to the line.

9. The method of handling gas consisting chiefly of hydrocarbons which comprises bringing water ice into heat exchange relation with water to cool the latter, placing in solution in the water a low concentration of approximately 2.0 per cent of one of a group of addition agents including ethyl alcohol and methyl alcohol, bringing the water with said addition agent into intimate contact with gas under temperature and pressure conditions effective to cause the formation of a solid hydrocarbon hydrate, agitating the gas and water mixture during the hydrate-forming reaction, storing the solid hydrate separately at atmospheric pressure under a temperature inhibiting a vapor pressure above that of the atmosphere, bringing the solid hydrate into heat exchange relation with water under a temperature and pressure effecting regasification of the hydrate, and introducing the regenerated gas to a gas distribution system.

10. The method of handling gas consisting chiefly of hydrocarbons which comprises bringing the gas into finely dispersed contact with a body of cold water normally flowing to the gas and present in an amount sufficient to satisfy a solid hydrocarbon hydrate forming reaction of the gas and the water, maintaining the gas when in such contact with the water at a temperture above the freezing temperature of the water and a related pressure effective to cause the formation of the hydrate, simultaneously maintaining the gas and water while in such contact in a state of agitation, collecting the solid hydrate formed in said reaction, forming the solid hydrate so collected into shape-sustaining blocks, and storing said solid hydrate substantially out of contact with water under substantially low pressure and temperature conditions inhibiting appreciable regasification.

MATTHEW E. BENESH.